United States Patent [19]
Zacharias et al.

[11] Patent Number: 5,101,886
[45] Date of Patent: Apr. 7, 1992

[54] COMBINATION POWER AND HEAT UNIT

[75] Inventors: Friedemann Zacharias, Weinheim; Louis Lorentz, Mannheim, both of Fed. Rep. of Germany

[73] Assignee: Motoren-Werke Mannheim AG, Mannheim, Fed. Rep. of Germany

[21] Appl. No.: 601,210

[22] Filed: Jun. 27, 1990

[30] Foreign Application Priority Data

Apr. 7, 1989 [DE] Fed. Rep. of Germany ....... 3921879

[51] Int. Cl.$^5$ ............................ F01N 7/02; F01N 3/02
[52] U.S. Cl. ................................... 165/51; 165/76; 60/320; 181/211; 181/232; 181/204; 181/243; 248/638; 248/639; 248/678
[58] Field of Search ................ 165/51, 76, 78; 60/295, 60/320; 181/232, 243, 204, 211, 212, 283; 248/678, 639, 638

[56] References Cited

U.S. PATENT DOCUMENTS

| 115,870 | 6/1871 | LaGorce | 165/78 |
| 2,673,446 | 3/1954 | De Salardi | 60/295 |
| 2,801,828 | 8/1957 | Wilson | 165/51 |
| 3,317,001 | 5/1967 | Powers et al. | 181/232 |
| 3,500,954 | 3/1970 | Willette | 181/232 |
| 4,653,031 | 2/1987 | Omura et al. | 181/232 |
| 4,921,040 | 5/1990 | Veruenduel et al. | 165/51 |

FOREIGN PATENT DOCUMENTS

| 0914203 | 10/1946 | France | 181/204 |
| 2550820 | 2/1985 | France | 60/295 |
| 0017416 | 2/1979 | Japan | 60/320 |

Primary Examiner—John K. Ford
Attorney, Agent, or Firm—Charles L. Schwab

[57] ABSTRACT

The invention relates to a combination power and heat unit with a bedplate (1), flanged-together machines (2, 3), a noise suppressor (8), an exhaust-gas heat exchanger (9), a cooling-water heat exchanger (19) as well as the associated auxiliary apparatus and piping, wherein the bedplate (1) shelters the noise suppressor (8) and the exhaust-gas heat exchanger (9) along its opposite longitudinal sides below the machines (2, 3), which are elastically supported on the bedplate (1). So that the bedplate will not impair the design of the devices, which are to be arranged in optimally accessible fashion, and will be suitable for various devices, it is provided that the bedplate (1) is open to the sides and exhibits a horizontal frame (6) supporting the machines (2, 3), which frame rests on a plurality of braces (7) arranged along the longitudinal axis of the bedplate (1), which braces are substantially x-shaped in the direction transverse to the longitudinal axis of the bedplate (1) and are arranged on the interior side between the noise suppressor (8) and the exhaust-gas heat exchanger (9).

17 Claims, 2 Drawing Sheets

COMBINATION POWER AND HEAT UNIT

TECHNICAL FIELD

This invention relates to a support structure of bedplate for a combination power and heat unit.

PRIOR ART STATEMENT

A combination power and heat unit is known from DE-OS [German Unexamined Application] 37 08 238, which combination power and heat unit provides for a bedplate, which has a parallelepipedal frame that exhibits openings on all sides as well as a central column through which pass a noise suppressor and an exhaust-gas heat exchanger, which are arranged parallel to the longitudinal side of the bedplate. In order to create a design that allows easy servicing with respect to the noise suppressor and the exhaust-gas heat exchanger, said units consist of at least two separable components, the length of each of which is shorter than the distance between the respective end and the central column of the bedplate. While said design permits individual installation and removal of these components, the design of the noise suppressor and the heat exchanger is constrained by the division at certain points in accordance with the arrangement of the central column and by established maximum lengths, or else an individual bedplate must be designed in accordance with the structure and design of the combination power and heat unit, which is very costly. Nor is accessibility optimal.

OBJECTS AND SUMMARY OF THE INVENTION

It is therefore the object of the invention to create a combination power and heat unit in accordance with the preamble of claim 1 whose bedplate does not impair the design of the devices, which can be arranged in optimally accessible fashion, and is suitable for various devices.

This object is achieved in accordance with the characterizing part of claim 1.

By virtue of the fact that the bedplate comprises a horizontal frame, which rests on substantially x-shaped internal braces, the design is simple and two to three braces, depending on the device, are sufficient, said braces not obstructing the pipes and the accessibility of the devices, since the bedplate is open to the sides Correspondingly simple is the design, which does not restrict the design of the devices (noise suppressor and exhaust-gas heat exchanger) with respect to their division or maximum length and does allow optimal accessibility for installation and removal as well as the usability of various machines. The inherently large and heavy components of the devices can be installed and removed without "threading in" and "threading out." In desirable fashion, they can simply be removed from laterally arranged supports. The outside dimensions can be reduced further in comparison with the prior art and the cost of the bedplate can be substantially lowered.

The cooling-water and heating-water pipes can be arranged at the end together with a cooling-water heat exchanger and are therefore likewise easily accessible.

Further embodiments of the invention can be understood from the description that follows and the dependent Claims.

BRIEF DESCRIPTIONS OF THE DRAWINGS

In what follows, the invention is explained in more detail on the basis of the exemplary embodiment illustrated schematically in the appended Figures.

DETAILED DESCRIPTION OF THE DRAWINGS

Figure 6:
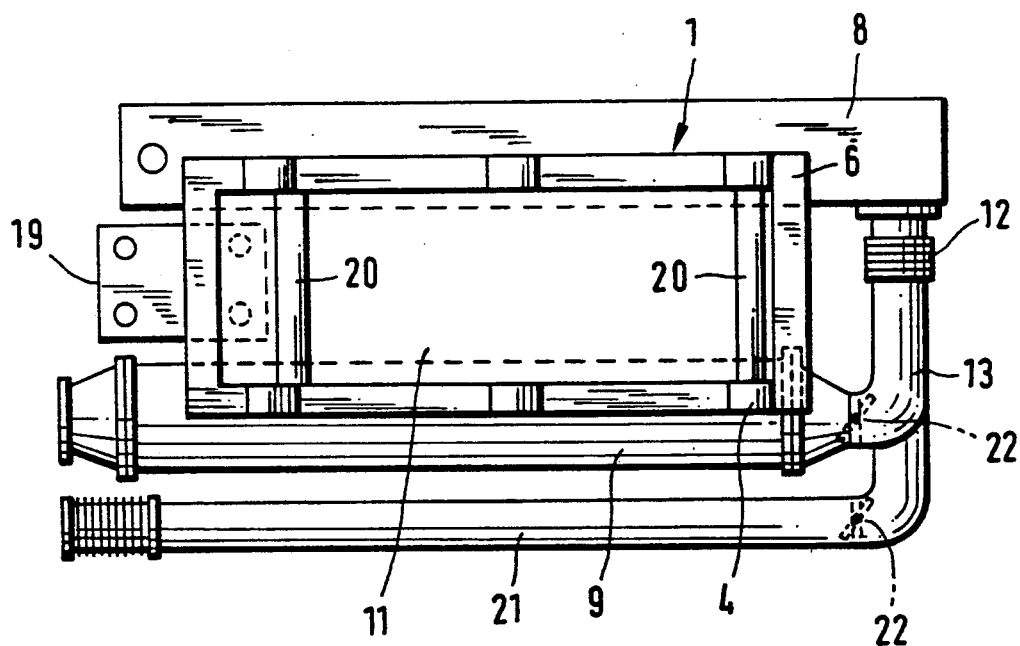

FIG. 6 shows the arrangement with bypass in the exhaust-gas system. The illustrated combined power and heat generation installation comprises a bedplate 1, on which a motor 2 and a generator 3 driven by said motor is mounted via elastic buffers 4. The motor 2 and the generator 3 are flanged together into one unit, which rests on the bedplate 1.

The bedplate 1 consists of two parallel horizontal frames 5, 6, which are connected to each other by, usually, two or three (depending on the unit) braces 7, so that the frames 5, 6 are arranged spaced apart from each other. The braces 7 are designed substantially x-shaped in the direction transverse to the longitudinal axis of the bedplate 1 and are arranged along the longitudinal axis of the bedplate 1 and spaced away from its ends, so that the bedplate 1 is open to the sides. Between the frames 5, 6, a noise suppressor 8 can be arranged on one longitudinal side of the bedplate 1 and an exhaust-gas heat exchanger 9 along the other longitudinal side, which noise suppressor and heat exchanger are desirably accommodated by lateral supports 10, which are borne by the lower frame 5. The braces 7 are located between the noise suppressor 8 and the exhaust-gas heat exchanger 9, the x-shape of the braces 7 being adaptable to the round cross section of the two devices 8, 9.

Figure 1:
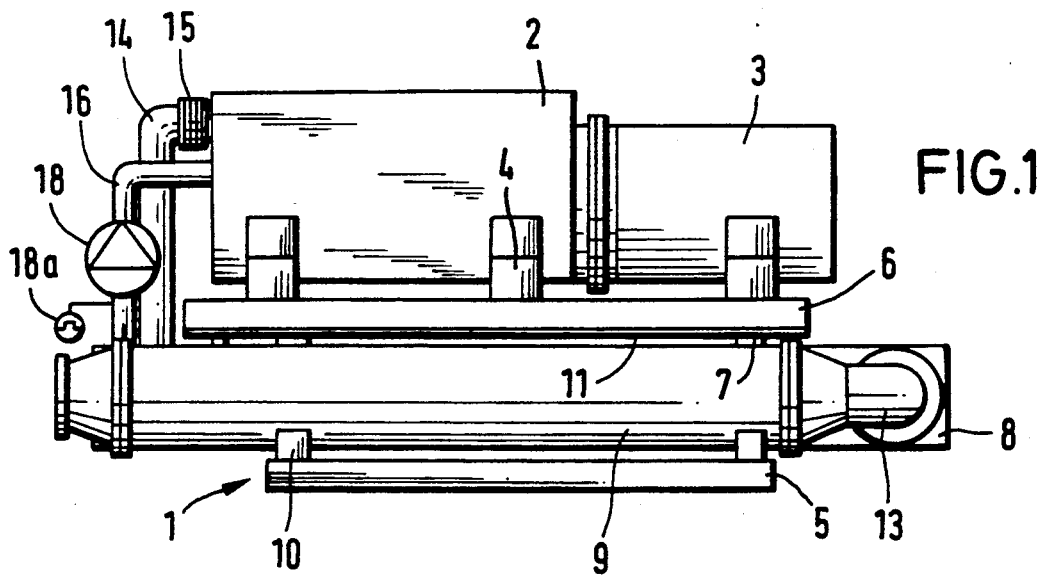
FIG. 1 shows in lateral view a combined power and heat generation installation.
Figure 3:
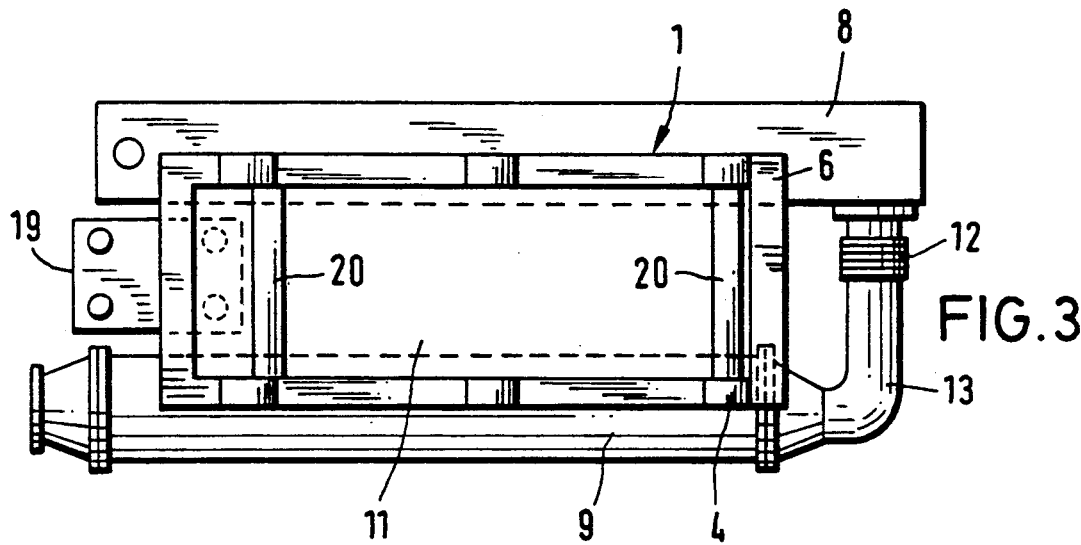
FIG. 3 shows a top view of the bedplate of the installation of FIG. 1.
Figure 4:
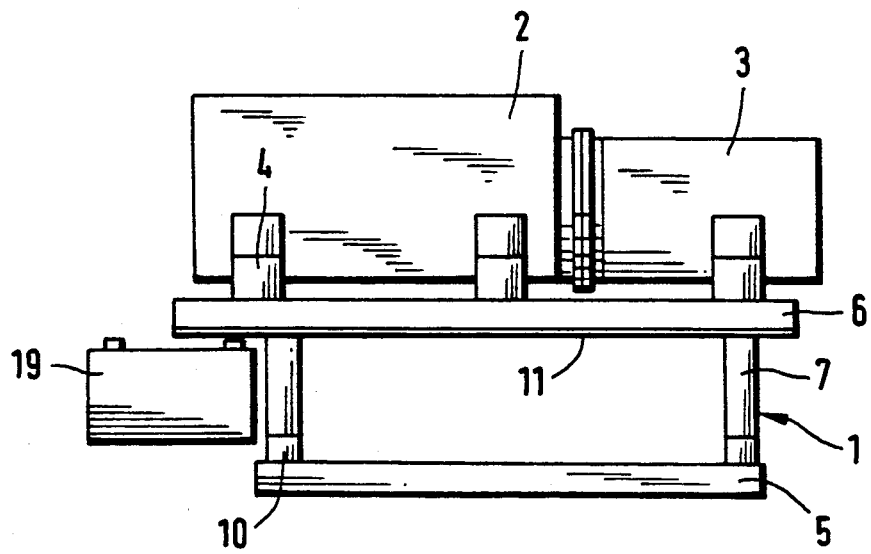
FIGS. 4 and 5 show the same views as FIGS. 1 and 2, but without the noise suppressor and the exhaust-gas heat exchanger.
Figure 5:
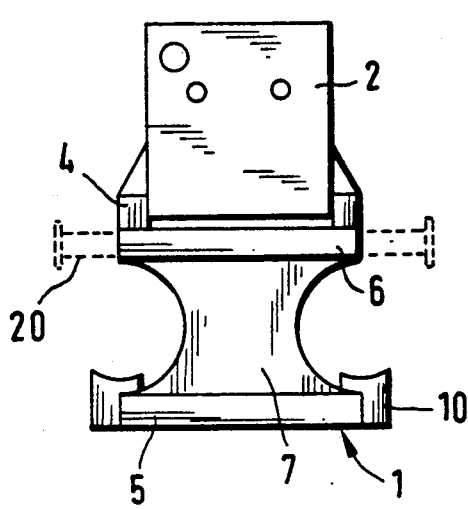
Figure 2:
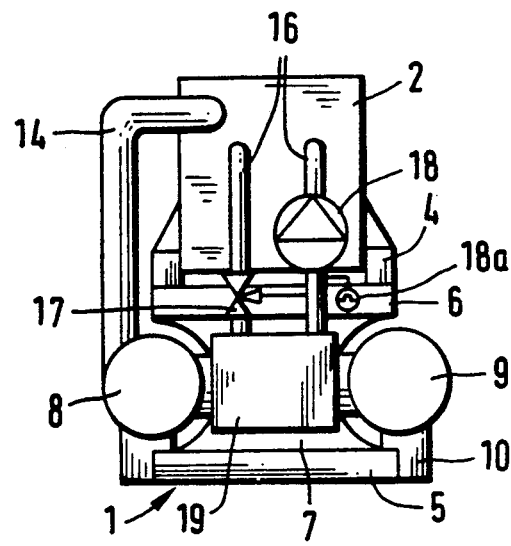
FIG. 2 shows an end view of the installation of FIG. 1.

The noise suppressor 8 and the exhaust-gas heat exchanger 9 are desirably accommodated to only about half of their depth or their diameter (see FIG. 2) between the frames 5, 6. On account of the accessibility of the space below the frame 6 from all sides, the bedplate requires only a relatively slight width.

The upper frame 6 has the function of protecting the unit against flexure and transmitting the supporting forces into the braces 7. It can be provided with an intermediate plate 11 beneath the motor 2 and, if appropriate, the generator 3 so that no oil can drip onto the noise suppressor 8 or the exhaust-gas heat exchanger 9.

The overall length of, say, the noise suppressor 8 and/or the exhaust-gas heat exchanger 9 can be greater than the length of the bedplate 1. Furthermore, the exhaust-gas heat exchanger 9, which is connected to the noise suppressor 8 via a pipe 13 provided with an expansion joint 12, can be connected upstream or downstream of said noise suppressor 8. Two-part or multi-part designs of noise suppressor 8 and exhaust-gas heat exchanger 9 can likewise be used without modification, and a desirable division, not tied to certain points, can be accomplished.

From the motor 2, an exhaust-gas pipe 14 provided with an expansion joint 15 leads either to the noise suppressor 8 or to the exhaust-gas heat exchanger 9.

The total number of exhaust-gas expansion joints 12 and 15 is limited to two, one on the discharge of the motor 2 for the lateral springing of the pitching motion of the unit, and another between the noise suppressor 8 and the exhaust-gas heat exchanger 9 for the accommodation of longitudinal thermal expansions of the unit.

The cooling-water and heating-water pipes 16, which comprise a thermostat 17, a pump 18 and a pressure compensating vessel 18a, are arranged at the end and together with a cooling-water heat exchanger 19. Said exchanger is located between the two frames 5, 6 as well as between the noise suppressor 8 and the exhaust-gas heat exchanger 9 and has its connecting flanges projecting beyond the bedplate 1 so that it can be removed, disassembled and cleaned without the removal of pipes. A plate-type heat exchanger, in particular, comes under consideration for the cooling-water heat exchanger 19.

The arrangement and the bedplate 1 make it possible to accommodate motor units with varying numbers of cylinders. The same cooling-water pipes can be used. Further, the bedplate 1 makes it possible to place the exhaust-gas and heating-water discharge at the generator end as desired, without any modification of components, in order to adapt to special circumstances.

An exhaust-gas heat exchanger bypass in the form of a bypass 21 can be installed as an addition to the unit without difficulty, appropriate valves 22 being provided, respectively, in the bypass 21 and upstream of the inlet to the exhaust-gas heat exchanger 9; see FIG. 6.

If, among other things, a vacuum motor 2 is used, a three-way catalyst can be mounted at the inlet to the noise suppressor 8 in an easily installable and serviceable fashion.

Crossbars 20 of the frame can be located on the braces 7, which crossbars can be extended outwardly for the engagement of hoisting ropes for the transport of the bedplate 1 or of the entire unit.

The embodiments of the invention in which an exclusive property or privilege is claimed are defined as follows:

1. A combination power and heat unit with a bedplate (1), flanged-together machines (2, 3) elastically supported on said bedplate (1), a noise suppressor (8), an exhaust-gas heat exchanges (9), a cooling-water heat exchanger (19), associated auxiliary apparatus and piping, wherein the bedplate (1) shelters the noise suppressor (8) and the exhaust-gas heat exchanger (9) along its opposite longitudinal sides below the machines (2, 3) characterized by said bedplate (1) being open to the sides and having a horizontal frame (6) supporting said machines (2, 3), a plurality of braces (7) arranged along the longitudinal axis of said bedplate (1) and supporting said horizontal frame (6), said braces being substantially x-shaped in the direction transverse to the longitudinal axis of said bedplate (1) and being arranged in enclosed fashion between said noise suppressor (8) and said exhaust-gas heat exchanger (9).

2. The combination power and heat unit of claim 1, characterized by said bedplate (1) having lower lateral supports (10) supporting said noise suppressor (8) and said exhaust-gas heat exchanger (9).

3. The combination power and heat unit of claim 1 wherein said bedplate (1) includes a lower frame (5) parallel to and below said horizonal frame (6), said lower frame being connected to said braces (7).

4. The combination power and heat unit of claim 1 wherein said noise suppressor (8) and said exhaust-gas heat exchanger (9) are mounted in outwardly overhanging fashion relative to said bedplate (1) in the direction transverse to the longitudinal axis of said bedplate.

5. The combination power and heat unit of claim 1 wherein said flanges together machines (2, 3) include a motor (2) and further comprising an exhaust-gas pipe (14) leading away from said motor (2) including only one exhaust-gas expansion joint (15) in said exhaust gas pipe (14) for the lateral springing of the motor pitching motion, and a pipe (13) arranged between said noise suppressor (8) and said exhaust-gas heat exchanger (9) including only one exhaust-gas expansion joint (12) in said pipe (13) for the accommodation of longitudinal thermal expansion between said noise suppressor (8) and said exhaust-gas heat exchanger (9).

6. The combination power and heat unit of claim 1 and further comprising cooling-water and heating-water pipes (16) and said cooling-water heat exchanger (19) arranged at the end of said bedplate (1) whereby said cooling water heat exchanger (19) can be disassembled and cleaned without the removal of said pipes.

7. The combination power and heat unit of claim 6 wherein said cooling-water heat exchanger (19) is arranged below said frame (6) in the region between said noise suppressor (8) and said exhaust-gas heat exchanger (9).

8. The combination power and heat unit of claim 1 wherein said cooling-water heat exchanger (19) is disposed at the front of the end of said bedplate (1) and further comprising heating water pipes connecting said heat exchanger to said power and heat unit.

9. The combination power and heat unit of claim 1 wherein said frame (6) includes an intermediate plate (11) supporting said machines (2, 3).

10. The combination power and heat unit of claim 1 wherein said frame (6) includes laterally extending crossbars (20) are arranged above said braces (7).

11. The combination power and heat unit of claim 1 wherein the arrangement and sequence, in the direction of gas flow, of said noise suppressor (8) and said exhaust-gas heat exchanger (9) are interchangeable without any modification of the basic design.

12. The combination power and heat unit of claim 1 and further comprising a bypass line (21) and exhaust-gas valves (22) operable to bypass said exhaust-gas heat exchanger (9).

13. The combination power and heat unit of claim 1 wherein said power and heat unit includes an engine (2) and a generator 3 and wherein said frame (6) is designed, on the generator end, in such fashion that various makes of generators can be accommodated without modification of said frame (6).

14. The combination of claim 1 wherein said bedplate includes a lower frame (5) parallel to and below said horizontal frame (6), said lower frame (5) being connected to said braces (7) and wherein said bedplate includes lower lateral supports (10) supporting said noise suppressor (8) and said exhaust-gas heat exchanger (9).

15. The combination of claim 14 wherein said noise suppressor (8) and said exhaust-gas heat exchanger (9) are mounted in outwardly overhanging fashion relative to said horizontal frame (6).

16. The combination of claim 14 and further comprising said cooling-water heat exchanger (19) disposed below said horizontal frame (6) and between said noise suppressor (8) and said exhaust gas heat exchanger.

17. The combination of claim 16 wherein said power and heat unit includes a motor (2) and said cooling-water heat exchanger (19) is disposed at one end of said bedplate (1) and further comprising cooling water and heating water lines (16) operatively interconnecting said cooling-water heat exchanger (19) with said motor (2), said cooling water heat exchanger (19) being removable from said power and heat unit without removal of said pipes (16) from said motor (2).

* * * * *

UNITED STATES PATENT AND TRADEMARK OFFICE
CERTIFICATE OF CORRECTION

PATENT NO. : 5,101,886

DATED : Apr. 7, 1992

INVENTOR(S) : Friedemann Zacharias and Louis Lorentz

It is certified that error appears in the above-identified patent and that said Letters Patent is hereby corrected as shown below:

Column 3, line 45, cancel "exchanges" and substitute --- exchanger ---;

Column 4, line 5, cancel "flanges" and substitute --- flanged ---.

Signed and Sealed this

Fifteenth Day of June, 1993

Attest:

MICHAEL K. KIRK

Attesting Officer

Acting Commissioner of Patents and Trademarks